United States Patent [19]

Eaton et al.

[11] Patent Number: 5,483,588
[45] Date of Patent: Jan. 9, 1996

[54] VOICE PROCESSING INTERFACE FOR A TELECONFERENCE SYSTEM

[75] Inventors: Glenn A. Eaton, San Jose; Joseph A. McFadden, Palo Alto; Stuart A. Taylor, Menlo Park; Edward D. Tracy, Palo Alto; Emil C. W. Wang, Menlo Park, all of Calif.

[73] Assignee: Latitute Communications, Santa Clara, Calif.

[21] Appl. No.: 363,720

[22] Filed: Dec. 23, 1994

[51] Int. Cl.⁶ .................................................. H04M 3/56
[52] U.S. Cl. ..................... 379/202; 379/67; 379/88; 379/89; 379/62; 370/62; 370/110.1
[58] Field of Search ............................ 379/202, 201, 379/207, 67, 88, 89; 370/62, 110.1; 348/14, 16

[56] References Cited

U.S. PATENT DOCUMENTS

| | | | |
|---|---|---|---|
| 3,883,697 | 5/1975 | Brown | 370/62 |
| 4,059,735 | 11/1977 | Betts | 370/62 |
| 4,061,880 | 12/1977 | Collins et al. | 370/92 |
| 4,076,966 | 2/1978 | Bovo et al. | 370/62 |
| 4,153,817 | 5/1979 | D'Ortenzio | 370/62 |
| 4,225,956 | 9/1980 | Betts et al. | 370/62 |
| 4,229,814 | 10/1980 | Betts | 370/62 |
| 4,254,497 | 3/1981 | Funderburk et al. | 370/62 |
| 4,267,593 | 5/1981 | Regan et al. | 370/62 |
| 4,271,502 | 6/1981 | Goutmann et al. | 370/62 |
| 4,305,149 | 12/1981 | Harrison | 370/62 |
| 4,317,007 | 2/1982 | Harrison | 379/34 |
| 4,424,418 | 1/1984 | Moore et al. | 379/204 |
| 4,456,789 | 6/1984 | Groves et al. | 379/202 |
| 4,488,291 | 12/1984 | Eschmann et al. | 370/62 |
| 4,540,850 | 9/1985 | Herr et al. | 379/67 |
| 4,550,224 | 10/1985 | Winchell | 379/202 |
| 4,635,251 | 1/1987 | Stanley et al. | 370/62 |
| 4,796,293 | 1/1989 | Blinken et al. | 379/202 |
| 4,805,205 | 2/1989 | Faye | 379/96 |
| 4,809,262 | 2/1989 | Klose et al. | 370/62 |
| 4,922,490 | 5/1990 | Blakley | 370/110.1 |
| 4,937,856 | 6/1990 | Natarajan | 379/158 |
| 4,975,902 | 12/1990 | Damany | 370/62 |
| 5,012,509 | 4/1991 | Nakamura et al. | 379/53 |
| 5,020,098 | 5/1991 | Celli | 379/202 |
| 5,034,947 | 7/1991 | Epps | 379/202 |
| 5,128,989 | 7/1992 | Nomura | 379/158 |
| 5,136,581 | 8/1992 | Muehrcke | 379/202 |
| 5,163,084 | 11/1992 | Kim et al. | 379/88 |
| 5,195,086 | 3/1993 | Baumgartner et al. | 379/202 |
| 5,199,062 | 3/1993 | Von Meister et al. | 379/67 |
| 5,210,794 | 5/1993 | Brunsgard | 380/9 |
| 5,212,726 | 5/1993 | Dayner | 379/202 |
| 5,239,573 | 8/1993 | Rangan | 379/88 |
| 5,274,695 | 12/1993 | Green | 379/88 |
| 5,323,445 | 6/1994 | Nakatsuka | 379/202 |
| 5,369,694 | 11/1994 | Bales et al. | 379/206 |
| 5,373,549 | 12/1994 | Bales et al. | 379/93 |

*Primary Examiner*—Jeffery A. Hofsass
*Assistant Examiner*—Scott Wolinsky
*Attorney, Agent, or Firm*—Blakely, Sokoloff, Taylor & Zafman

[57] ABSTRACT

A teleconferencing system having screened introductions, named introductions, roll call, talker identification, and subconferencing, scheduling, and recording options. A caller attempting to join a teleconference is prompted to enter identification information by generating corresponding DTMF signals. The caller's identification is used to index the caller's profile stored in memory. The profile includes a memory address pointer to the location at which data representative of the spoken name of the caller is stored. The caller's identification is also checked against a list specified by the meeting organizer and stored in memory to determine whether the caller is to be admitted to the teleconference. If the caller is to be admitted to the teleconference, an announcement is generated to the attendees of the teleconference using the caller's spoken name retrieved from memory. Likewise, when the attendee leaves the conference, the system detects the attendee disconnecting and retrieves the attendee's spoken name stored in memory in order to generate an announcement to the attendees: "XYZ has left the conference." The system is responsive to requests by attendees during the teleconference. The attendees communicate with the system by depressing buttons on their touch tone phones which generate DTMF signals. The system also has the capability of scheduling new conferences and automatically checking for any conflicts.

60 Claims, 12 Drawing Sheets

FIG. 4B

| | Description |
|---|---|
| First Name | This person's first name. |
| Last Name | This person's last name. |
| User ID | This person's ID. (Used from a workstation) |
| User Password | The password this person uses to log on to the server from a workstation |
| Profile Number | This person's ID when calling from a phone. |
| Profile Password | The person's password |
| User Active? | Is the person currently an active user? |
| Type of User | Whether this person is an end user, a contact or attendant, a system manager, or a technician. |
| Group Name | The name of the user group (if any) to which this person belongs. Numeric |
| User ID Contact | The ID of the contact or attendant who supports the person. |
| Time Zone | The time zone of the office in which this person usually does business. |
| Use Group Time Zone? | Should the Time Zone designated in the Group Profile be used? |
| Abbreviated Prompts | Will the server play abbreviated or unabbreviated prompts when this person calls the server. If the person is a member of a user group, enter prompt preference information only when it differs from the information you entered for the group. |
| Billing Code | A code for generating billing reports. |
| Record Meeting? | Select whether a meeting scheduled by this person is set up to be recorded by default. If this person is a member of a user group, enter this information only when differs from the information you entered for the group. |
| Password Required? | Whether a conference call scheduled by this person is set up to require a password by default. If this person is a member of a user group, enter this information only when it differs from the information you entered for the group. |
| Announced Departure? | Whether a conference call scheduled by this person is set up to include announced departure by default. Announced departure means that when someone leaves a meeting, their name is announced to the rest of the attendees. If this person is a member of a user group, enter this information only when it differs from the information you entered for the group. |
| Announced Entry? | Whether a conference call scheduled by this person is set up to include announced entry by default. Announced entry means that when someone enters a meeting, their name is announced to the rest of the attendees. If this person is a member of a user group, enter this information only when it differs from the information you entered for the group. |
| Screened Entry? | Whether a conference call scheduled by this person is set up to include screened entry by default. Screened entry means that people who want to join the meeting are not admitted automatically but are screened. If this person is a member of a user group, enter this information only when it differs from the information you entered for the group. |

(Profile Access Overview)

(Conference Call Scheduling Process)

(Conferencing Options)

(Unavailable Resources)

(Attending a Conference Call)

(Joining A Conference Call)

(Conference Call in Progress)

VOICE PROCESSING INTERFACE FOR A TELECONFERENCE SYSTEM

FIELD OF THE INVENTION

The present invention pertains to the field of teleconferencing systems. More particularly, the present invention relates to a voice processing interface for a teleconferencing system.

BACKGROUND OF THE INVENTION

Often, large manufacturers having multiple plant locations must conduct design team meetings to coordinate the efforts of engineers and designers scattered amongst the different sites. Sometimes, staff meetings are necessary for managers overseeing employees at those multiple sites. Additionally, meetings might be required to monitor critical project milestones, synchronize plant operations, preparations of logistics, conduct installation, troubleshooting, etc. The attendees for these meetings might be geographically dispersed. For professional service firms such as investment banking, brokerages, lawyers, and accountants, meetings are frequently held to discuss various matters. Again, the attendees are frequently from different locations.

It is quite expensive for each individual to physically attend the meeting. Airfare, car rental, and hotel accommodations can be quite expensive. Furthermore, the attendees' valuable time is wasted traveling to and from the meeting site. These expenditures are compounded if attendees have to travel great distances or internationally. Moreover, there could be complications in making reservations. Furthermore, setting up and coordinating the meeting and rescheduling it if need be, is a thankless, time-consuming, and tedious task.

One way for minimizing costs, time, and frustration involves teleconferencing. Teleconferencing is the process of conducting a meeting with a group of attendees simultaneously over the telephone. Thereby, each of the attendees can communicate in real-time, without having to actually be there in-person.

In the past, teleconferencing was initiated in Private Branch Exchange (PBX) telephone systems by a first attendee calling a second attendee; placing that second attendee on hold; calling a third attendee; placing the third attendee on hold; and repeating this process until all the attendees had been accessed. This prior art teleconferencing system suffers from several disadvantages. The conferencing functionality is cumbersome, unwieldy, and difficult for the user to invoke. Each of the attendees are serially patched in to the conference on a piece-meal basis. The degradation in voice quality becomes annoying when three or more parties are conferenced together. Furthermore, it was quite difficult to handle overflows, cancellations, no-shows, etc.

One alternative to PBX teleconferencing has been to utilize service bureau providers for multi-site conferencing. Basically, a service bureau provider acts as an intermediary between the different sites. An operator speaks with callers wishing to engage in a telephone conference and provides the necessary telephone connecting and switching functions to enable the teleconference to occur. Although a service bureau provider offers superior functionality over standard PBX conferencing, a provider is extremely expensive for the regular user of conference calls.

In some instances, large corporations have taken to installing customer premise equipment, such as conference bridges, to help defray costs. A conference bridge provides a teleconferencing interface between different sites. Before the meeting occurs, an operator assigns a bridge number for that meeting. The bridge number is disbursed to the attendees. At the appointed meeting time, each of the attendees calls a central number to speak with a corporate operator. Once the caller tells the corporate operator the bridge number, the operator connects the caller to the bridge. Once connected, the conference bridge automatically handles all the requisite switching.

Typically, both service bureau providers and conference bridge applications require a human operator to coordinate, establish, and otherwise facilitate the entire teleconferencing process. Obviously, having a human operator increases the overall cost. Furthermore, unless the service bureau and conference bridge is monitored by the operator twenty-four hours a day, users might be limited to certain times in which they can access particular teleconferencing functionalities. Another problem is that an operator can only handle one call at a time. During peak hours, it might be necessary to employ multiple operators. Moreover, having a human operator introduces another source for error. Yet another problem of having to access the teleconferencing system via an operator is that security might be compromised. Often, the business being discussed pertains to delicate, serious, and highly confidential matters. Third party access, such as access by the operator, to these discussions is highly undesirable. This is especially true where the operator is not even employed by the conferees.

In addition, typical prior art teleconferencing systems suffer from several functional drawbacks. When a party is first connected into a teleconference, the calling party is unaware of who the current participants are (i.e., the parties who have already been connected into the teleconference). Likewise, current participants will want to know the identity of a caller logging into the teleconference. Similarly, whenever a party logs out of the teleconference, the remaining conferees will want to be apprised of who has left. There is much confusion each time someone logs in or out of the teleconference. Although an operator can provide relief from these problems, having an operator introduces its own problems as discussed above.

Another drawback is that typical prior art teleconferencing systems do not have the capability of providing subconferencing. Frequently, several conferees will wish to discuss side issues apart from the main conference. Those parties wishing to hold a side conference have to hang-up; initiate a new conference amongst themselves; terminate the new conference when completed; and rejoin the original conference. There does not exist any mechanism for allowing two or more conferees to break away to a side conference and then to later rejoin the main conference.

Yet another drawback is that it can be quite difficult to determine who is currently speaking. This problem of keeping track of who is saying what is especially troublesome when the conference includes strangers whose voice patterns are unfamiliar. It can be difficult to follow the gist of the conversation if one is unsure of the speaker's identity.

Thus, there is a need in the teleconferencing prior art for an apparatus and method for providing enhanced features without having to go through an operator. It would be preferable if such a teleconferencing system included some security control to ensure access only to the authorized parties. It would also be preferable if such a system also had subconferencing as well as speaker identification capabilities.

SUMMARY OF THE INVENTION

The present invention is an improved audio teleconferencing system which eliminates the need for a human operator to perform teleconferencing tasks and provides advanced teleconferencing features. One or more of the following features may be incorporated into the system: screened introductions, named introductions, roll call, talker identification, subconferencing, scheduling, and recording. A caller attempting to join an audio teleconference is prompted to enter their identification. The system responds to the entry of the caller's identification by retrieving from a database a voice recording of the caller's spoken name. This is provided to the switching system causing the announcement of the caller to the connected participants or attendees of the teleconference. The caller is automatically connected to the teleconference after the announcement.

The named introductions feature announces the name/identity of callers when they first join the conference. For example, the system prompts a caller wishing to join a teleconference for identification. Using the identification, the system retrieves the spoken name of the caller and generates an announcement "XYZ is joining the conference". Similarly, when an attendee leaves the conference, the system retrieves the voice recording of the attendee's name and announces "XYZ has left the conference."

A number of features are available to a participant during the teleconference simply through the use of DTMF tones. The information is audibly provided through the switching network unobtrusively to only the requesting participant without disturbing the remaining participants. For example, during the conference, any of the attendees may initiate a roll call, whereby the system announces the names/identities of all the current attendees of the conference. Any of the attendees may also cause the system to announce the name/identity of the attendee who is currently speaking.

Another feature of the present invention is subconferencing. Two or more attendees of the main conference may elect to disengage from the main conference to hold their own subconference. Note that both the subconference and the main conference are conducted simultaneously in real-time. Later, the attendees of the subconference can choose to rejoin the main conference. All of the options (e.g., screened introductions, named introductions, roll call, talker identification, etc.) are also available during subconferences.

Furthermore, in the currently preferred embodiment, the teleconferencing system has the capability of prompting a caller to supply conference scheduling information and automatically determining whether there are enough resources to handle the requested conference schedule. If there are enough resources, the teleconference system confirms the schedule with the caller and issues a conference call ID. The conference call ID is used by the attendees when they subsequently request to join the conference. However, if there are not enough resources, the system informs the caller of a conflict and prompts the caller for an alternative schedule.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A is a diagram illustrating the software architecture of one embodiment of the conference server and FIG. 4B is exemplary information contained in a user's profile.

DETAILED DESCRIPTION

An apparatus and method for providing an integrated voice subsystem enabling automated teleconferencing is described. In the following description, for purposes of explanation, numerous specific details are set forth, such as voice prompts, passwords, caller options, etc., in order to provide a thorough understanding of the present invention. It will be obvious, however, to one skilled in the art that the present invention may be practiced without these specific details. In other instances, well-known structures and devices are shown in block diagram form and process steps are shown in flowcharts in order to avoid unnecessarily obscuring the present invention. Furthermore, it is readily apparent to one skilled in the art that the specific sequences in which menus and menu items are presented and functions are performed are illustrative and it is contemplated that the sequences can be varied and still remain within the spirit and scope of the present invention.

Figure 1:
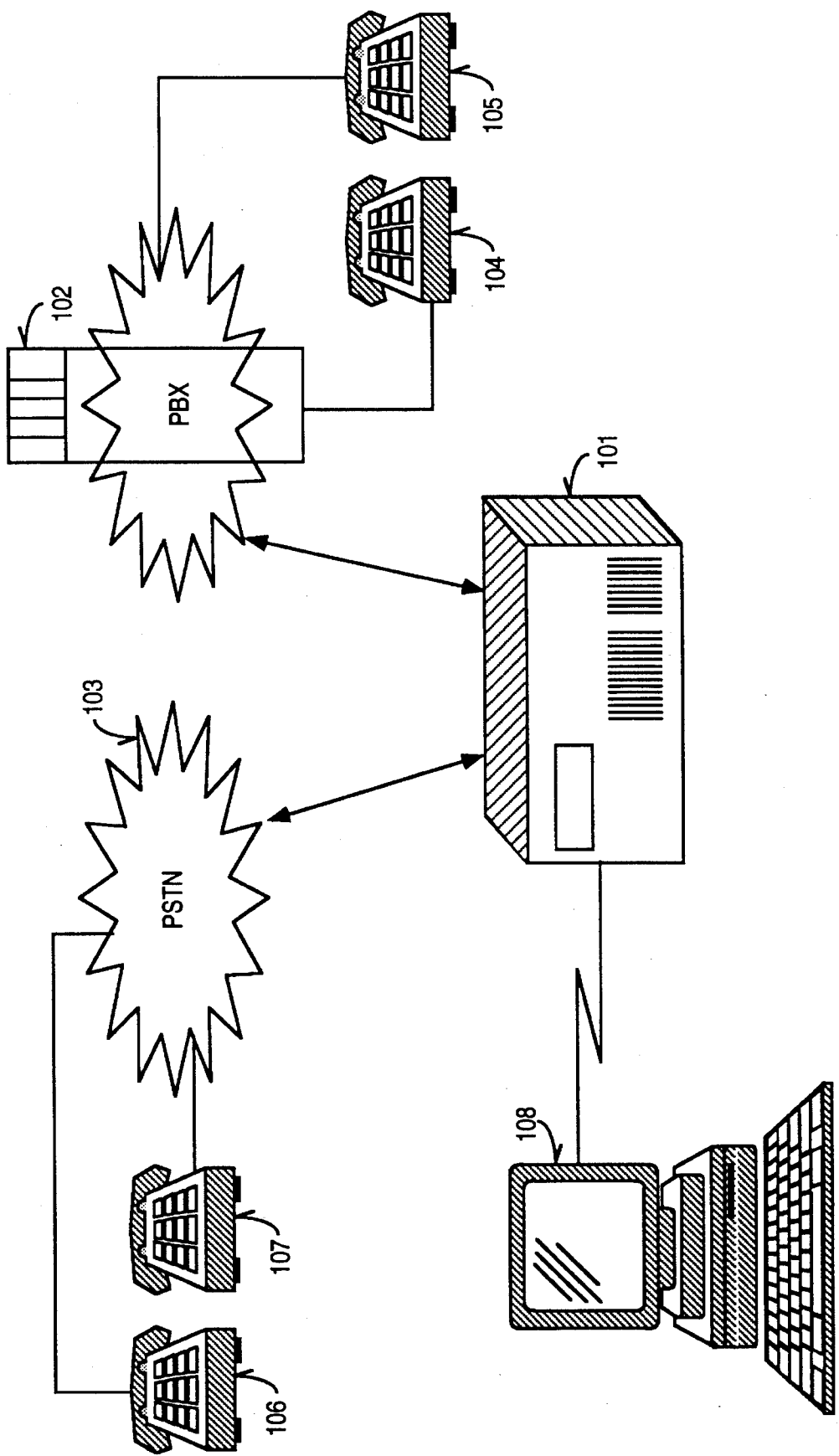
FIG. 1 shows an audio conferencing system upon which the present invention may be practiced.

FIG. 1 shows an audio conferencing system upon which the present invention may be practiced. Referring to FIG. 1, a conference server 101 is a piece of customer premise equipment that is coupled to a PBX 102 or Centrex system via a standard trunk connection. The conference server can also be coupled to a Public Switched Telephone Network (PSTN) 103. In one embodiment, one or more personal computers 108 interconnected in a local area network are coupled to the conference server 101 for providing enhanced functionalities. It is through the conference server 101 that teleconferencing is provided. Thereby, users on telephone sets 104–107 can communicate with one another in an audio teleconference.

Figure 2:
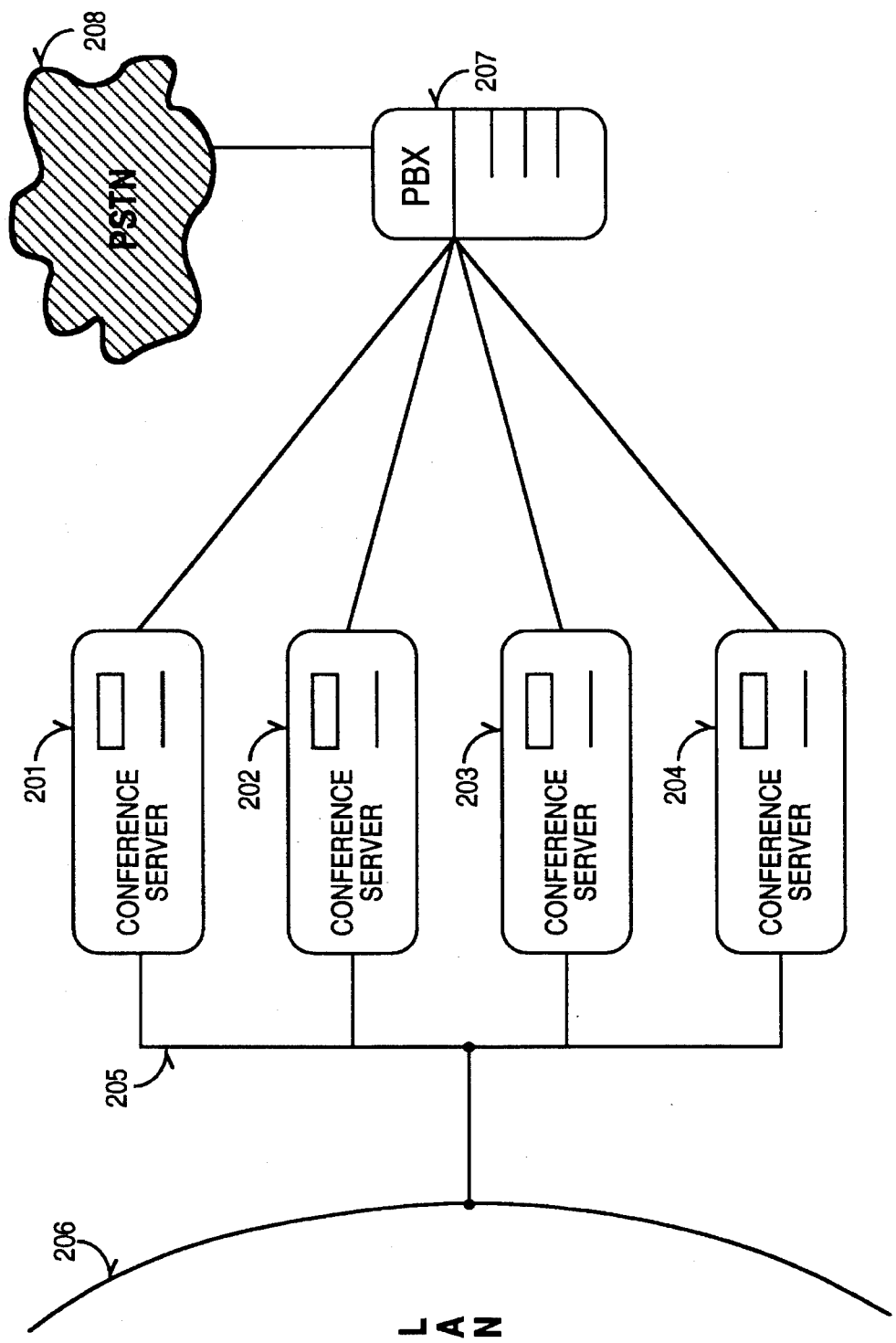
FIG. 2 shows another embodiment of an audio teleconferencing system upon which the present invention may be practiced.

FIG. 2 shows another embodiment of an audio teleconferencing system upon which the present invention may be practiced. It can be seen that multiple conference servers 201–204 can be interconnected to form a single, integrated system having a large number of ports. This provides for expandability. The integration is accomplished by extending a data and a control path 205 from LAN 206 to each of the conference servers 201–204. In turn, each of the conference servers is connected to the PBX 207 and PSTN 208. This allows for gradual degradation of service if an individual conference server fails.

Figure 3:
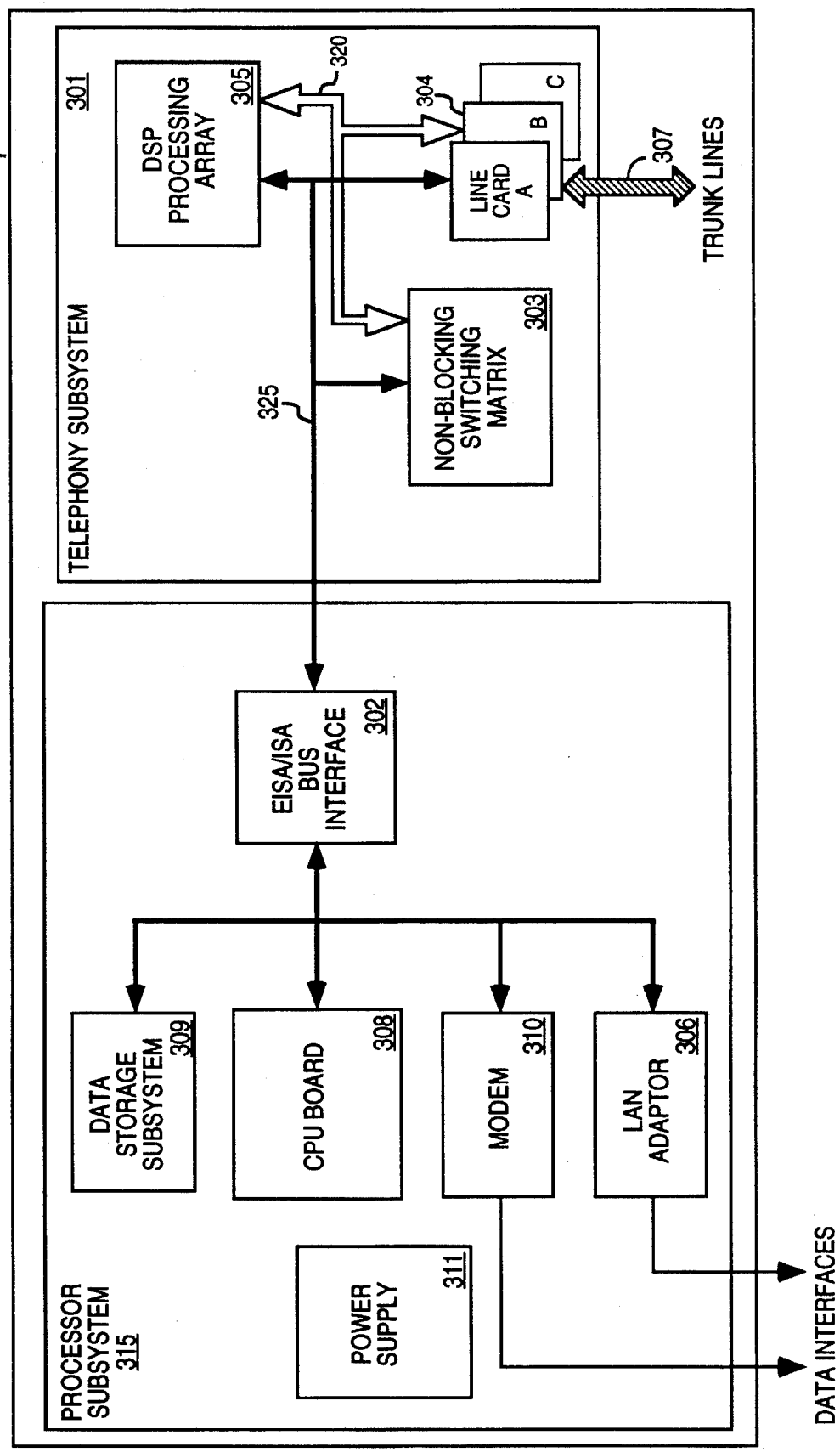
FIG. 3 shows a block diagram of one embodiment of the conference server.

In the currently preferred embodiment, the conference server unit is a single mechanical assembly capable of being mounted in a rack, stood on the floor in a tower configuration, or placed on a desktop. A block diagram of one embodiment of the conference server is shown in FIG. 3. The conference server 300 is comprised of a telephony subsystem 301 having a non-blocking switching matrix 303, line cards 304, a DSP processing array 305 and a switching matrix bus 320.

Switching matrix 303 is a multi-port, full duplex, time switched and non-blocking cross-point switch for routing voice signals received from and transmitted to incoming trunk lines 307 via the line cards 304 and the DSP processing array 305. Preferably, both analog and digital trunk connections are supported. The voice signals are transferred between the line cards 304 and the DSP processing array 305 over the switching matrix bus 320.

The DSP processing array 305 includes multiple, programmable DSP engines (e.g., TMS320, manufactured by Texas Instruments, Inc.) for compressing voice to/from 32 KBPS for storage/playback. For example, when a caller is to join a conference, the spoken name of the caller is retrieved from memory for playback to the conference participants as part of the announcement. In addition, the system provides the capability to record a teleconference. Thus, the DSP processing array 305 receives the voice data representative of the recording, compresses the voice data for subsequent storage. The DSP engines are also used to detect DTMF tones when an attendee or caller depressed keys on a touch tone phone, provide automatic gain control of voice signals which arrive on incoming trunks 307, power limit outgoing audio which output to the trunk lines 307 and detect and eliminate noise and any silence which occurs during recording.

In addition, the DSP processing array 305 performs the mixing of voice signals to provide conferencing of participants. For example, the nonblocking switching matrix 303 causes voice signals received from a first conference participant through a first line card 304 and voice signals received from a second conference participant through a second line card 304 to be transferred to the DSP processing array over the switching matrix control bus 320. The DSP processing array 305 mixes the first and second voice signals. The switching matrix 303 receives the mixed signals provides the voice signals of the first and second participants to the line card 304 connecting to a third conference participant such that the third participant hears the voices of the first and second participants.

The telephony subsystem is connected to a processor subsystem which provides control signals for operation of the conferencing system. For example, processor subsystem 315 instructs switching matrix 303 as to which voice signals are to be mixed and connected to a particular line card coupled to an identified participant. The processor subsystem 315 is connected to the telephony subsystem 301 via a processor control bus 325 and EISA/ISA bus interface 302. Preferably, the bus interface 302 supports a multi-slot PC standard bus architecture, so that off-the-shelf CPU and telephony line cards can be incorporated.

The central processing unit (CPU) board 308 contains one or more microprocessors and RAM and is used to control conference server functions, such as telephone line card operations, management of system databases, such as the scheduling conference database and user profiles database discussed herein, coordination of call processing within the DSP processing array, support of maintenance access, and communication with an administrative PC coupled to the server.

System software, audio prompts, and system and user database information are stored in the data storage subsystem 309. Any number and different types of storage devices may be incorporated as part of data storage subsystem 309. In the currently preferred embodiment, a single 3.5" fixed base system disk drive is used to store program and database information. An optional 3.5" disk drive may be used for storing optional voice recording. A single high capacity tape cartridge unit is used for backup and restoration of system data. Another 3.5" floppy disk drive is used for program load. In addition, EPROM, flash, and removable memory systems (e.g., PCMCIA) can also be implemented.

A modem 310 is implemented to provide for a dial-in connection to the processor subsystem 315. For example, this enables remote support of the server to be provided. Power supply 311 is used to convert incoming 110 VAC to the voltage needed to power the conference server 300.

The LAN adapter 306 is used to interface with LAN/WAN (e.g., Ethernet or 10 Base T) connections for coupled devices such as an Administrative PC, modem connections for remote support, and RS232 serial port interfaces for system debug.

Figure 4A:
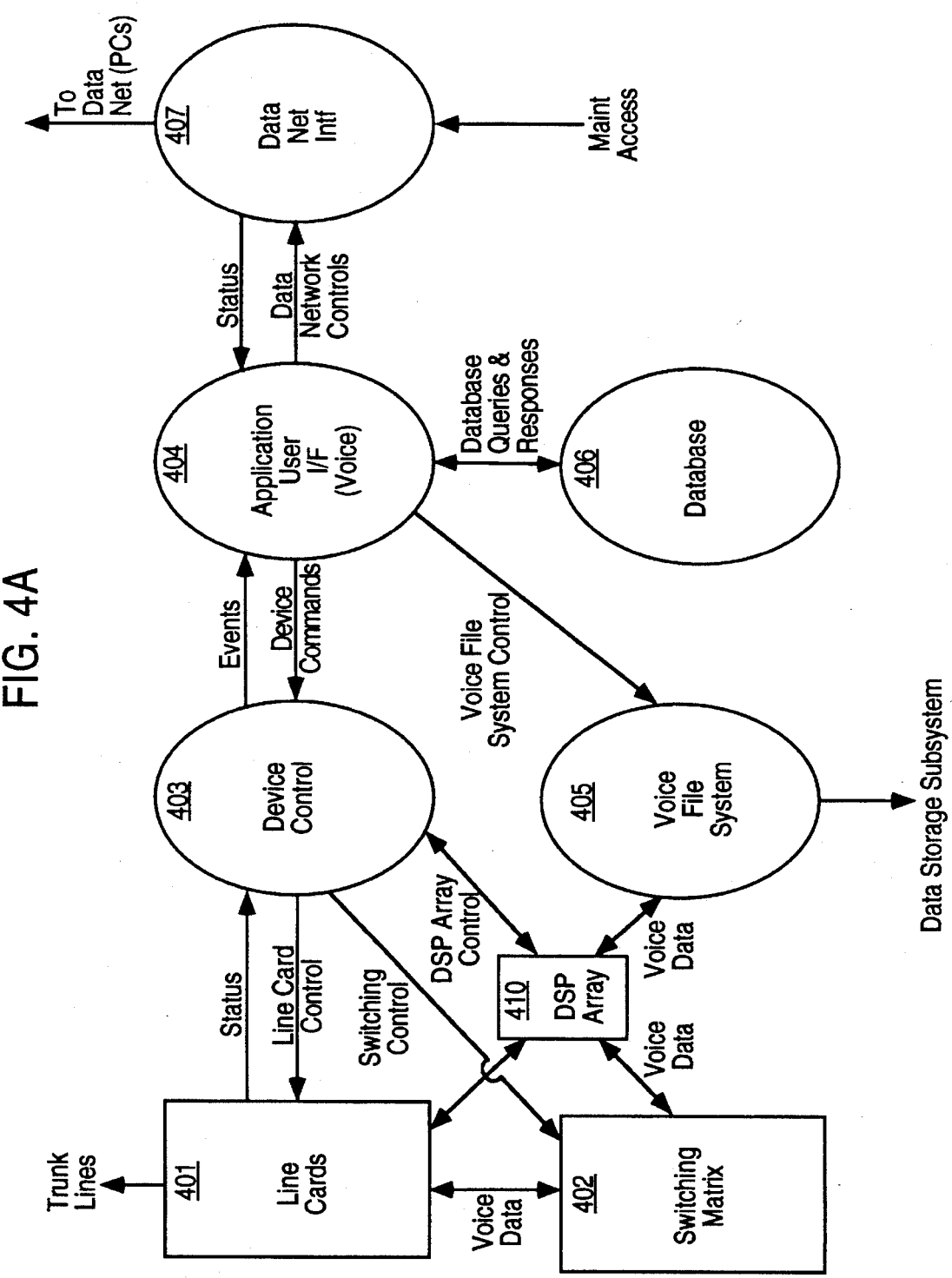

FIG. 4a is a diagram illustrating the software architecture of one embodiment of the conference server. Referring to FIG. 4a, the conference server software includes the following integrated modules: device control module 403, application user interface module 404, voice file system module 405, database module 406 and data network interface module 407.

The device control module 403 is coupled to the line cards 401, switching matrix 402 and the DSP 410 to issue control signals to control the devices 401,402,410. For example, the device control module 403 issues the proper control signals to switching matrix 402 to perform the switching to route the voice signals among the line cards 401 and the DSP array 410. The device control module 403 also receives status information from the line cards 401 and DSP array 410 and includes call processing software to interpret telephone network activity (e.g., incoming seizure, far end disconnect) received from the line cards 401 and user input DTMF tones, detected by the DSP array 410. In response to telephone network activity, the device control module 403 issues events to the user application module 404.

The user application module 404 is viewed as the central module which controls the operations performed by the teleconferencing system. The user application module responds to user input, received as events from the device control module 403, to invoke the features of the system, such as the roll call feature, described herein. In addition, the user application module 404 interfaces with the database module 406 and voice file system 405 to store voice prompts and spoken names of users and to retrieve and play back the prompts and spoken names during operation of the system.

The voice file system 405, controlled by the user application module 404, stores and outputs voice data. More particularly, the voice file system 405 is coupled to the DSP array 410 and memory and enables real time support of a multi-port voice subsystem providing simultaneous playback and record operations as part of the automated teleconferencing services described herein. For example, when a caller wishes to join a teleconference, the spoken name of the caller is retrieved by the voice file system from the data storage subsystem and output to the DSP array 410. The DSP array 410 processes the name and outputs the signals subsequently through the switching matrix 402 to line cards 401 for communication of a verbal announcement to the conference participants that the caller, identified by the spoken name, is joining the conference.

The system includes a configurable database 406, preferably stored in a data storage subsystem, which is accessed by the user application module 404 to operate the system. The database typically includes system information that controls the operation of the hardware and software of the server and the interface between the system and the telephone network. In addition, the database includes company specific information that records administrative information and scheduling/usage parameters. In one embodiment the system information includes network parameters regarding data network addresses used by the server. Telephone access information that determines the type of services available to the caller is also included.

The database also includes user profiles. Preferably, each user profile is distinguished by a user ID. Each user profile contains information that identifies the user preferences as to how the teleconferencing system is to operate when the user schedules a conference. For example, the user profile will contain the user's preferences regarding the enabling and disabling of certain features of the teleconferencing system. Thus a teleconference can be scheduled easily by a user. Furthermore, each user profile also includes a pointer to the user's spoken name accessed through the voice file system 405. Preferably, when a user profile is established, the system prompts the user to speak his/her name to the system whereby the system records the user's spoken name for subsequent playback during the generation of certain announcements. Each user profile identifies a user to the server and classifies the type of access the user requires. Furthermore, the classification identified in the user profile determines the features of the server that are available to the user. Preferably, each user profile includes the fields as set forth in the table of FIG. 4B.

The user's spoken name, utilized by the system to announce the entrance of each caller to the other conference attendees, is identified by accessing the user's profile. In particular, if a caller is to join a conference, the user application module 404 queries the database module 406 for the user's profile. The profile is identified by a user ID, preferably entered by the caller by generating DTMF tones which are detected by the DSP array 410, communicated to the device control module 403 and to the user application module 404. Once the use profile is accessed, the database module 406 provides the pointer to the user's spoken name. This pointer is provided by the user application module 404 to the voice file system module 405 with a command to generate the announcement of the caller joining the conference. The voice file system module 405 responds by retrieving the announcement and the spoken name from the voice data storage, outputting the voice data to the DSP array. The DSP array 410, under control of device control module 403, decompresses the data and outputs the data to the switching matrix 402, which is instructed by the user application module 404, via the device control module 403, to switch the voice data to the line cards 401 corresponding the conference participants so that the conference participants hear the announcement.

The data network interface module 407 provides network connectivity to the administrative PC and allows database access and update from an external workstation. In the currently preferred embodiment, there are up to 120 ports that are available for audio conferencing in a single system. These ports can be utilized in any combination of conferences and any number of attendees. For example, the system at any time many accommodate a single conference with 120 attendees or 30 different conferences with four attendees each. The hardware/software architecture described above allows for dynamic port allocation with minimal limits on the number of calls or the number of conferees per call.

The present invention performs five basic functions: scheduling a future conference call, conducting an immediate conference call, rescheduling a conference call, attending a conference call, and listening to a recorded conference call. Preferably a user is provided with a single phone number to access these functions which are available to a user through a menu navigated through by the user through the generation of certain DTMF tones. The integrated switching matrix allows a caller to be connected to any resource, another trunk, voice processing or to an operator. Callers are guided through the conferencing system by a series of prerecorded verbal prompts. Callers use DTMF touch-tone inputs to select options and input information to the audio conferencing system. Although a live operator is not required in order for a user to schedule or attend a conference, the system can be configured to designate access to a live operator as there may be instances when callers would find it more convenient to have outside assistance. For instance, a user might forget the meeting identification number or if there are scheduling conflicts.

Initially, a user calls a number defined as a "profile access" in the system database. The profile access acts as a user account where users can use their telephones to schedule a conference, select a conference to attend, manage recorded voice segments, and perform basic administrative functions such as changing their password.

Figure 5:
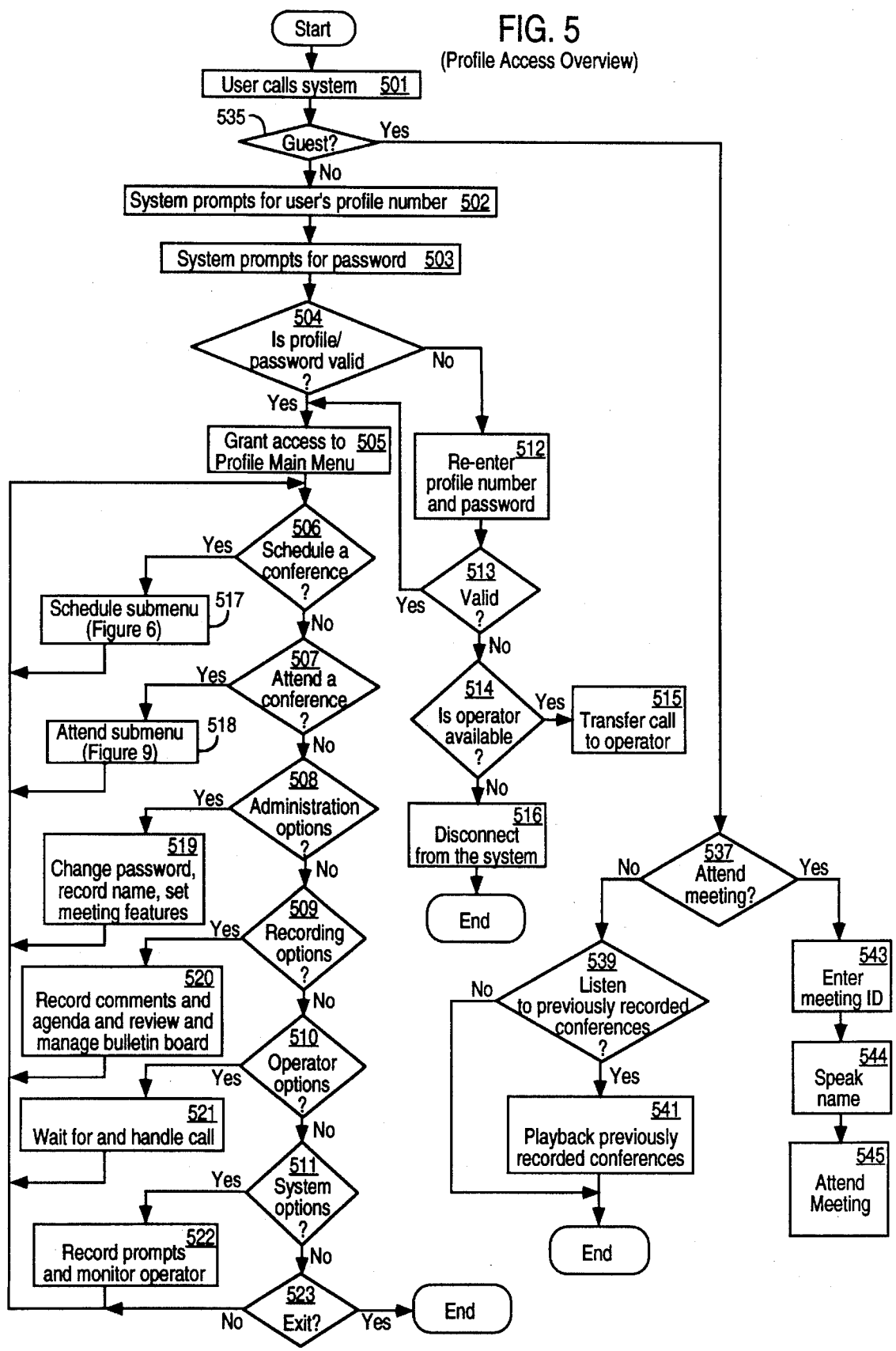
FIG. 5 is a flowchart describing the profile access procedure.

FIG. 5 is a flowchart describing the profile access procedure. Initially, a user calls the system, step 501. The caller is greeted with a customized recording, such as "Welcome to the XYZ System." The caller navigates through the system by entering in DTMF codes using the user's touch-tone telephone. The system first prompts the caller for a profile identification number, step 502. The system also prompts the caller for a password (if required), step 503. The user enters the profile number and password by pressing the appropriate touch tones on the telephone which cause the generation of the DTMF codes. The system may optionally confirm the profile and/or password with the caller.

If the user is not registered in the system, that is, no user profile exists for the caller, the caller will be treated as a guest, step 535. A guest is given the option to attend a meeting, steps 537, 543, 544 and 545 or listen to previously recorded teleconferences, steps 539, 541. If the guest wishes to attend a meeting, the guest is prompted to enter the meeting identification to identify the teleconference to be connected to, step 543. In addition, at step 544, the guest is prompted to speak his name. The system temporarily records the guest's spoken name in a guest profile. The guest profile enables the system to perform the voice processing functions described herein which utilize the spoken name of attendees to a teleconference. The guest profile is removed from the system at completion of the teleconference. The guest then is able to attend the meeting, step 545.

The validity of the entered profile and password are checked against authentic profiles and passwords stored within the system, step 504. If the either the profile and/or password entered by the caller is invalid, the caller is given an opportunity to re-enter the profile or password, steps 512–513. In the alternative, if there is an operator for handling audio conferencing system calls (as determined by being defined in the system operator database), the call will be transferred to the operator, steps 514–515. However, if there is no operator available and the profile and/or password is still entered incorrectly, then the system informs the caller to "Please contact your system administrator for assistance in gaining access to your profile" or "The password you entered is not valid." The caller is then disconnected from the system, step 516.

Once the caller enters the correct profile and password, access to the profile main menu is granted, step 505. From this main menu, the caller has several options (steps 506–511), which can be invoked by pressing the corresponding key(s) of the telephone. If the user profile established includes preferences regarding the enabling of features, a number of steps discussed below can be bypassed by the user.

In step 506, the caller can schedule a conference. Whenever the caller selects this function, the caller is presented with a "schedule" submenu, step 517. In step 507, the user can choose to attend a conference. By invoking this function, the user is presented with an "attend" submenu, step 518. In step 508, the user has access to a wide range of administrative options. For example, a message, "You may record the name used to identify you in conferences, change the password or prompt level for your profile or define default conference feature options. To record your name, press 1. To change your password or prompt level, press 2. To set default feature options, press 3." In step 519, the function chosen by the caller is invoked (e.g., changing the password, recording name, or setting meeting features).

Step 509 allows the caller to set the recording options. This function allows the caller to record comments and agenda, as well as review and manage a "bulletin board," step 520. At step 510, if an operator has been assigned to the system, the caller can choose to interact with the operator. The operator waits for and handles any request by the caller, step 521. And at step 511, system options are settable by the caller. For example, the caller can record customized prompts, monitor the operator, etc., step 522. The system waits for the caller's selection. If no selection has been made after a certain time period, step 523, the system prompts: "The system is about to disconnect this call. To stay connected, you must select one of the choices now." If a selection is still not forthcoming, the system plays the following message, "You are being disconnected from the system because we have not received a selection. If you need assistance, please contact the system administrator." The caller is then disconnected.

Figure 6:
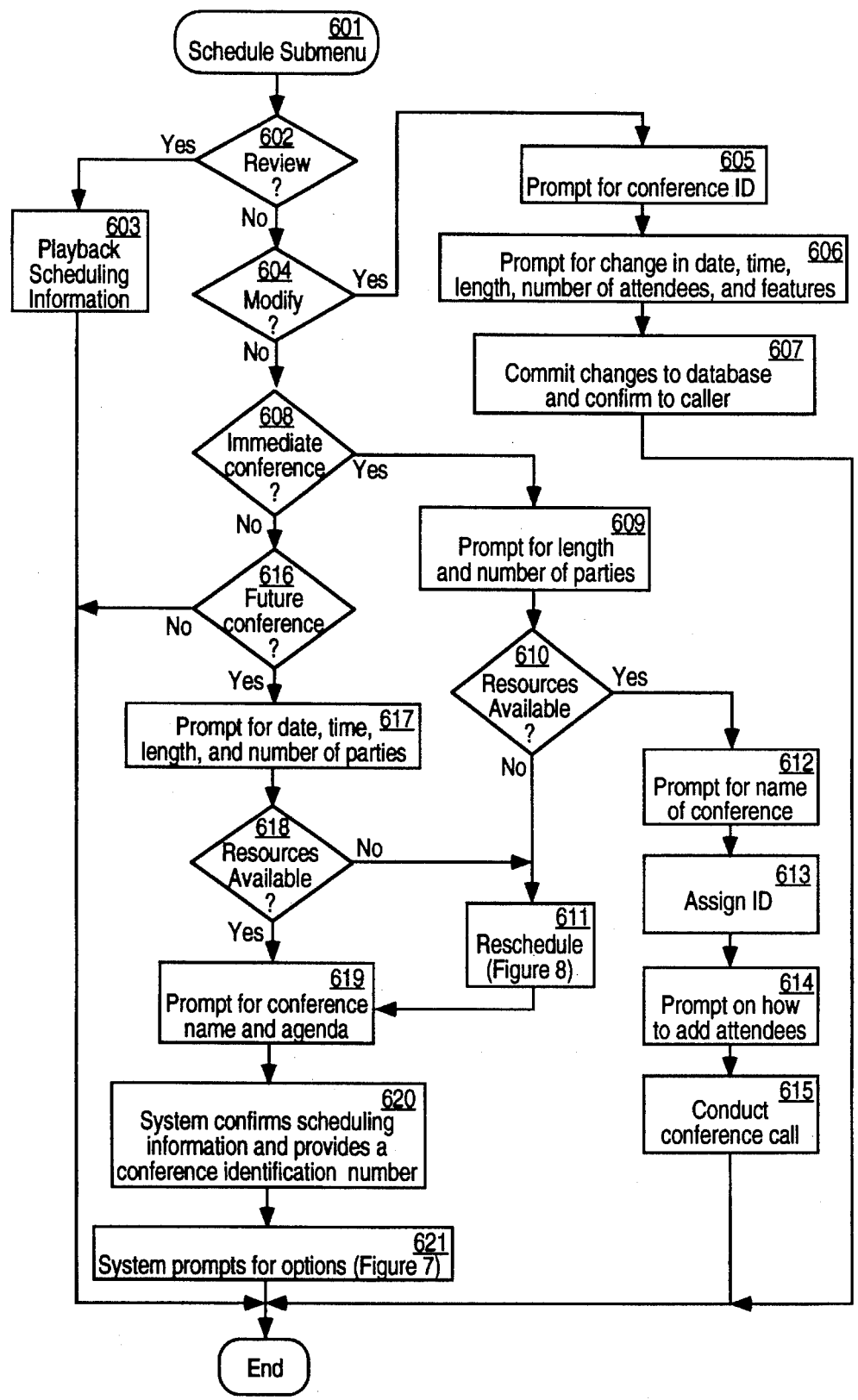
FIG. 6 is a flowchart describing the steps for scheduling a teleconference.

FIG. 6 is a flowchart describing the steps for scheduling a conference call. When the caller is in the schedule submenu, step 601 (FIG. 5, step 517), the caller is presented with three options. The system informs the caller of these options, "You may now schedule a new conference call, review conference calls you have previously scheduled, or modify a previously scheduled conference call." To review previously scheduled conference calls, the user presses 2, step 602. The scheduling information is retrieved from system memory and played back to the caller, step 603.

To modify a previously scheduled conference call, step 604, the caller presses 3. Thereupon, the system prompts the caller for the conference call identification (ID) number, step 605. If the caller enters a valid ID, the system prompts the caller for the change in the date, time, length, number of attendees, and conference features, step 606. For example, the system prompts the caller that, "You have requested to change one of the conference call parameters. To change the date on which the conference call will occur, press 1 now; to change the start time of the conference call, press 2 now; to change the length of the conference call, press 3 now; or to change the number of parties, press 4 now." Next, the new information is written to the system database, step 607.

When scheduling a conference call, the system prompts the caller as to whether is conference call is to be held immediately or in the future, steps 608 and 616. If it is determined in step 608 that the conference call is to be held immediately, steps 609–615 are processed. In step 609, the system prompts the caller for the length and number of parties. In one embodiment, the system confirms the request, "You are trying to schedule a call right now for {number of parties} for {length} minutes. If this is correct, press #; if not, press *." This gives the caller a chance to correct an erroneous entry,. The system then consults the database to determine whether enough resources are available for supporting the requested length and number of parties, step 610. If the number of parties is greater than the number of available ports on the system, the system informs the caller that, "The largest size call your system can handle is {speak number of conference ports}. Please enter a number of parties less than this number or contact your system administrator."

The system checks the database to determine whether there are sufficient resources to accommodate the conference call requested. If it is determined in step 610 that there is not enough resources available for handling the requested conference call, the system informs the caller that, "We are sorry but your request conflicts with previously scheduled conference calls." The system proceeds to prompt the caller to reschedule the conference call, step 611.

If it is determined in step 610 that are enough resources, the system announces to the caller in step 612, "System resources are available for your meeting. At the tone, please speak the name of the conference call followed by the # key. This recorded name will be used to identify the conference call to callers. *beep*." The system then prompts the caller as to how the caller wants the attendees to be added, step 614. Thereupon, the system sets up the conference call, step 615.

If the caller wishes to schedule a conference call in the future, steps 617–621 are executed. In step 617, the caller is prompted to enter the date, time, length, and number of attendees. A determination is made as to whether there are enough resources to conduct the requested conference call, step 618. If there are not enough resources, the caller is asked to reschedule the conference call, step 611. Otherwise, the system prompts the caller for the conference call name and the agenda for that conference call, step 619. The system confirms the scheduling information and provides an ID number corresponding to the scheduled conference call, step 620. Finally, the system prompts the caller for conferencing options, step 621. Some examples of conferencing options include named introductions, security measures, screened introductions, time awareness, and talker identification.

Figure 7:
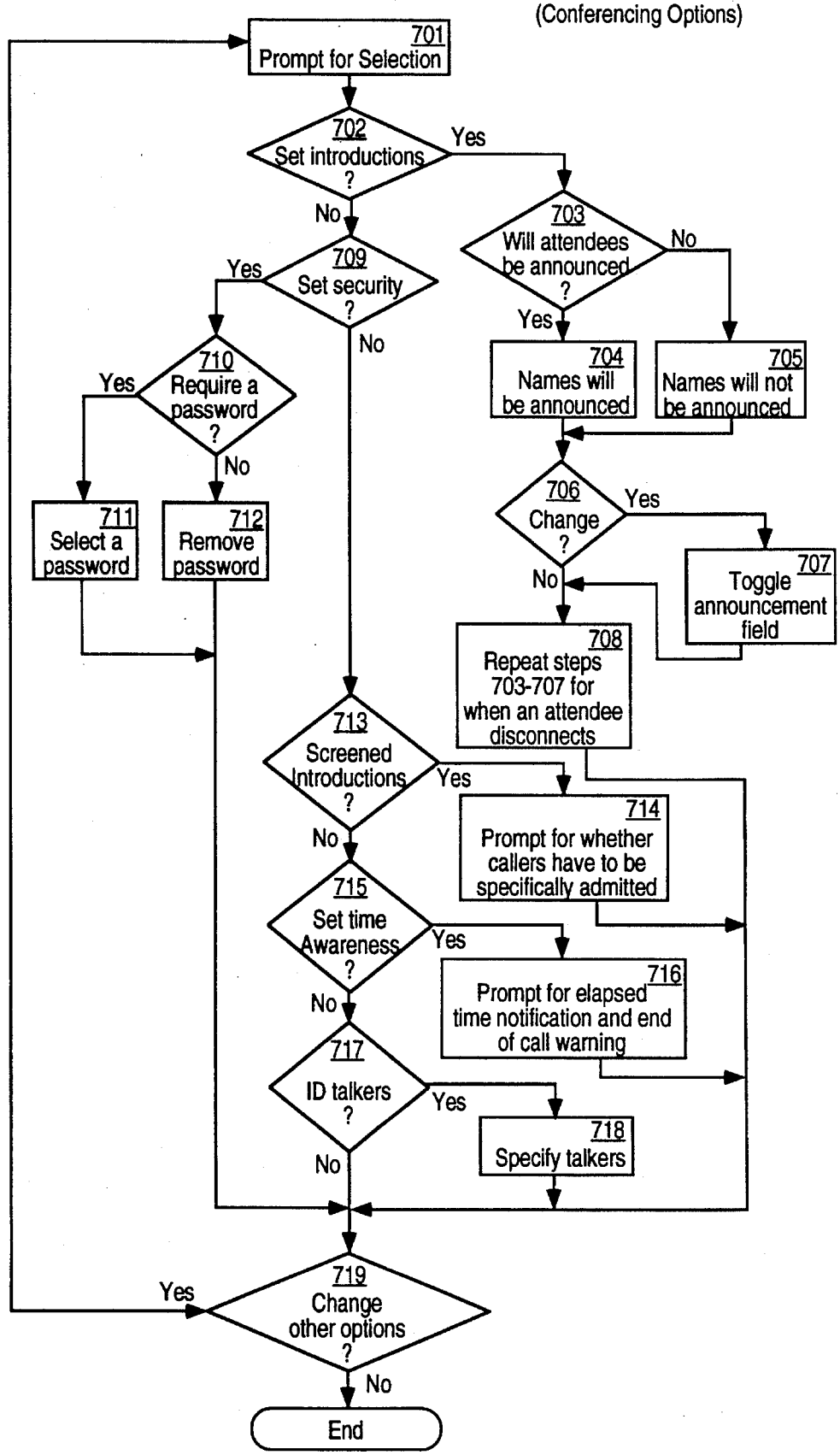
FIG. 7 is a flowchart describing the steps for implementing conferencing options.

FIG. 7 is a flowchart describing the steps for selecting conferencing options when scheduling a conference call. In step 701, the caller is prompted to make a selection. For example, the system might inform the caller, "To change the attendee introduction methods used in this conference call, please press 1; to change security options, please press 2; to set screened introductions, please press 3; to set time awareness parameters, please press 4; to define who will be allowed to talk during this call, please press 5 now." Step 702 determines whether the caller wishes to set the introductions feature. If so, the system announces that "Currently, attendees of this meeting {will/will not} be announced by name when they join the conference call and {will/will not} be announced when they disconnect from this conference call." Depending on the value already established for this announcement field, the system picks the appropriate prompt message. The system determines whether the attendees' names are currently set to be announced when they join the conference call, step 703. The caller is informed of the current status in steps 704 and 705. In step 706, the caller is given an opportunity to change the current status. If the caller wishes to change the current status, the announcement field is toggled, step 707. Similarly, steps 703–707 are repeated for determining and setting whether attendees names are to be announced when they disconnect from the conference call, step 708.

In step 709, the system determines whether the caller wishes to change security measures associated with the conference call. The caller can elect to require that a password be entered before access is granted to the conference call, step 710. If a password is required, the system prompts the user to choose the password, step 711. The system then confirms that, "A password is now required for this conference call. The password is {give password}." Otherwise, the password requirement is removed, step 712. The system informs the caller that, "A password is no longer required for this conference call."

In step 713, the system determines whether the caller wishes to alter the screened introductions feature. If so, the caller is prompted as to whether callers have to be specifically admitted before they can attend the conference call, step 714. For example, the system will announce that, "Callers {will/will not} have to be specifically admitted to this conference call."

In step 715, the system determines whether the caller wishes to alter the time awareness features. If so, the system prompts the caller as to whether the "elapsed time notification" and "end of call warning" functions are to be enabled, step 716. Thereby, the caller can enable and disable the "elapsed time" function, wherein the elapsed time of a conference call is announced every X minutes. Similarly, the caller can enable and disable the "end of call warning" function, wherein the attendees are warned X minutes prior to the end of their scheduled time of the conference call.

In step 717, the system determines whether the caller wishes to alter the "ID talkers" function. The system provides for two types of conference call attendees: those who can speak and listen (referred to herein as a "talker") and those who are authorized only to listen. The "ID talkers" function allows the caller to specify particular attendees who may speak and be heard by all of the other attendees, step 718. The system can prompt the caller that, "The conference server system allows you to specify which parties on the call may speak and be heard by all of the other parties. You may specify up to eight people who may speak during the call. You may do so by identifying them by their profile number on the system. In order to identify a specific individual as a speaker, they must have a profile on the conference server." After selection by the caller, the system confirms. For example, the system can confirm that "Currently, all parties to this meeting will be able to speak and be heard during the conference call" or "Currently, only you will be able to speak and be heard during this conference call" or "Currently, {spoken names (if available) of all defined talkers or profile numbers if spoken names are not available} will be able to speak and be heard during this conference call." In step 719, the caller is given the opportunity to change other options.

Figure 8:
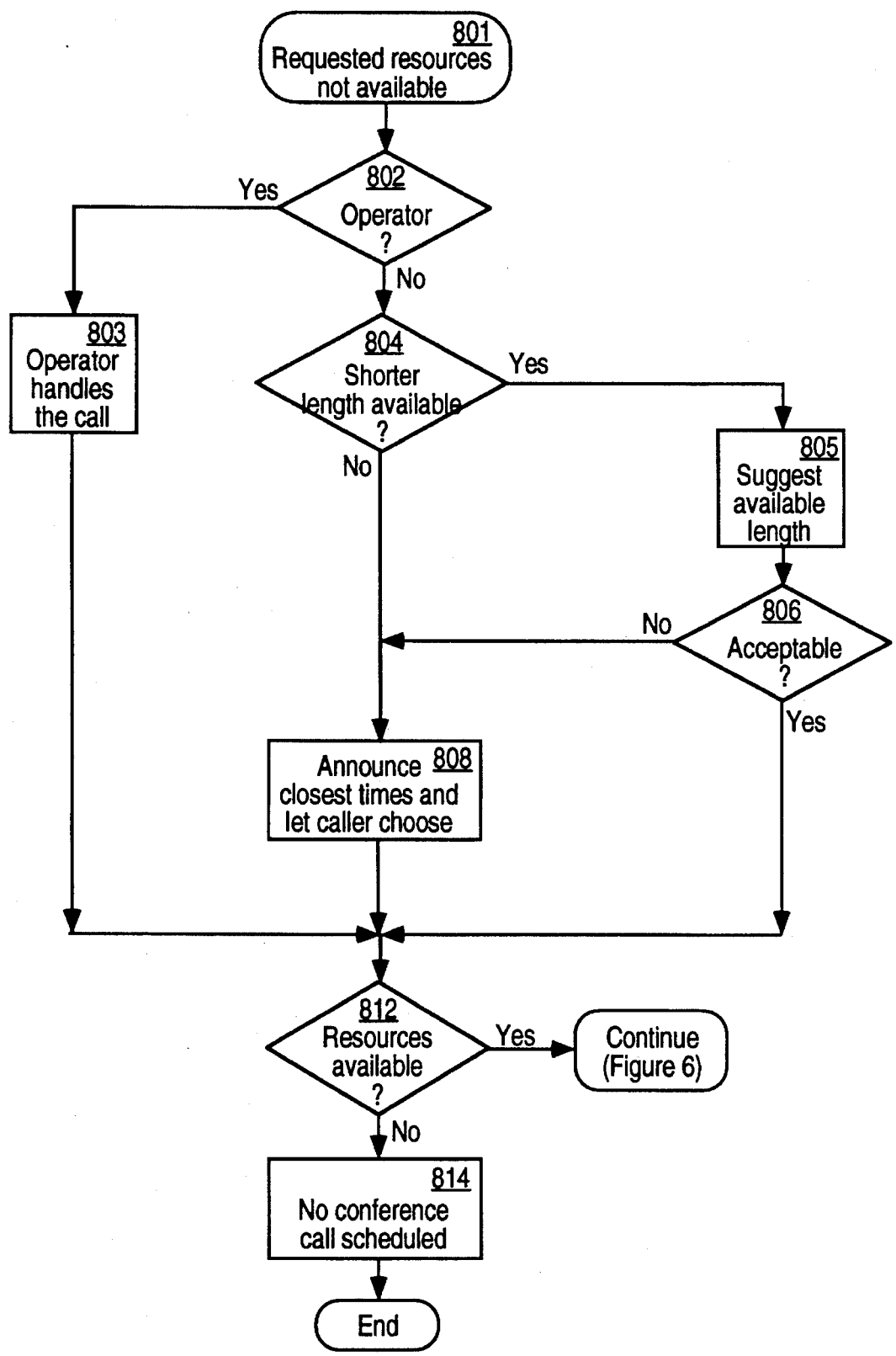
FIG. 8 is a flowchart describing the steps taken when there is not enough resources available for handling the requested teleconference.

FIG. 8 is a flowchart describing the steps by the system taken when there are not enough resources available for handling the requested conference. First, the system informs the caller that, "We are sorry but your request conflicts with previously scheduled conference calls," step 801. If an operator is available, then the caller may request that the conflict be resolved via the operator, steps 802–803. Otherwise, the system checks to determine whether a shortened conference call could possibly be supported, step 804. For example, if the conference call is greater than one hour and the system can handle at least one hour plus 50% of the requested time in excess of one hour (e.g., 1.5 hours requested, 1.25 hours available; or 3 hours requested, 2 hours available), then the system informs the user that, "The system can accommodate the conference call beginning at that time and lasting a total of {speak available time}", step 805. The caller indicates whether this shortened time is acceptable, step 806.

If the shortened time is not sufficient, the system announces the closest available times and lets the caller select from these times, step 808. For example, the system could prompt the caller, "The system could accommodate your conference call at {total slots available} different times within three hours of your requested start time. To hear a list of these available times or to change the start time of the conference call press 1 now; to change the date of the meeting, press 2 now; to return to the main menu without scheduling the conference call, press * now." At step 812, if the resources are still not available, no conference call is scheduled, step 814. If the resources are available the scheduling process continues (FIG. 6, step 619).

Figure 9:
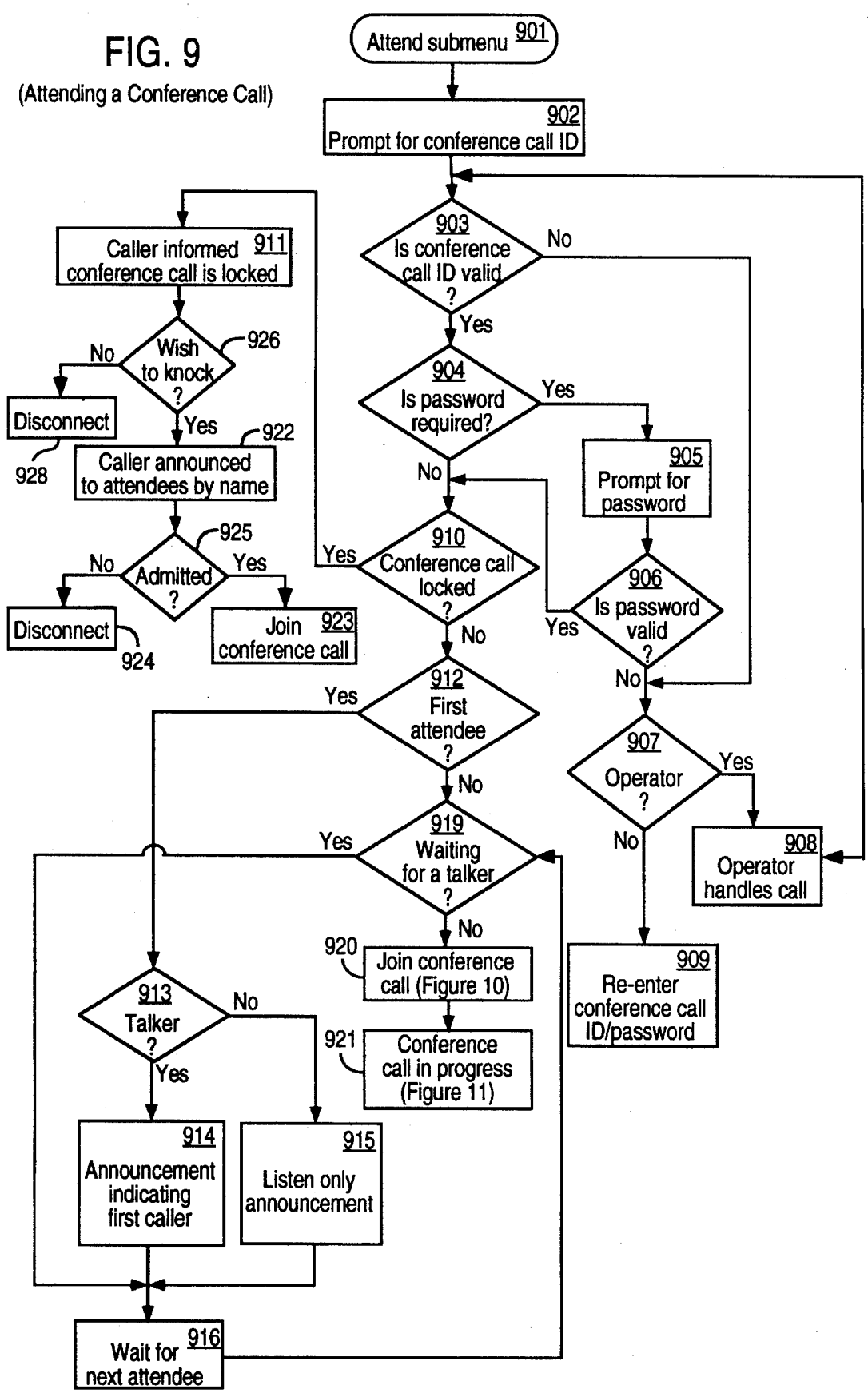
FIG. 9 is a flowchart describing the steps for attending a conference.

FIG. 9 is a flowchart describing the steps for attending a conference call. More particularly, FIG. 9 describes the functions performed by the system to check a conference call password and when a first attendee calls in. When a caller wishes to attend a conference call, the caller is directed to the "attend" submenu from the main menu, step 901 (FIG. 5, steps 507, 518). The system asks for the conference call ID, step 902. A determination is made as to whether the given conference call ID is valid, step 903. If the conference call ID is invalid, operator assistance is offered (if available), steps 907–908. If no operator assistance is available, the caller is given another chance to enter a valid conference call ID, step 909.

Once a proper conference call ID has been entered, the system responds by stating, "You entered {speak conference call name if recorded; if not recorded, speak conference call ID number}." The system then determines whether a password is required by the organizer for that particular conference call, step 904. If a password is required, the system prompts the caller to provide the proper password, step 905, and determines whether the password is valid, step 906. If an invalid password is entered, the system either provides operator assistance (if available) or requests that the password be re-entered, steps 907–909. Before access to the meeting is granted, the system checks to determine whether that meeting has been locked, step 910. If the meeting has been locked, the caller is informed that the meeting is locked, step 911. The system may then play the following recording "Press 1 to knock for admittance, or press 2 to disconnect from the system". The caller is then given the opportunity to "knock" or request access into the locked meeting, step 926. If the caller does not want to knock, the caller is disconnected, step 928. If the caller wishes to knock, the caller is announced to the conference call attendees by retrieving the caller's spoken name from the voice subsystem and playing it back to the conference call attendees, step 922. The attendees can then elect to admit the caller to the conference by generating the appropriate DTMF code, step 925. If the conference call attendees do not want to admit the caller, the caller is notified by a voice prompt that admittance to the conference call has not been granted and the caller is disconnected, step 924. If the attendees elect to admit the caller, step 923, the caller is admitted to the conference call.

If the conference call is not locked and either the valid password is given or if a password is not required, access to the conference call is granted. When this happens, the system determines whether the caller is the first party to log into the conference call, step 912. If the caller happens to be the first attendee, a determination is made as to whether that caller is a talker, step 912. If a caller who is a talker happens to be the first attendee, the system informs the caller in step 914, "You are the first party to join the conference call. We will connect you with the next party as soon as they join." The caller then waits until the next caller joins, step 916. If it is determined in step 913 that the caller is not a talker, then the system informs the caller, "You will be attending this conference call as a listen only attendee. If you speak, others on the call will not be able to hear you. The call leader has not yet arrived. Please wait." step 915. The caller is then placed on hold until a next caller calls in and is connected, step 916.

If it is determined in step 912 that the caller is not the first attendee to the conference call, then a subsequent determination is made as to whether the caller or one of the prior attendees is a talker, step 919. If a talker has yet to call in to the conference call, step 916 is executed. Otherwise, the caller joins the conference call as an attendee and the conference call begins between the first two "talker" attendees who called in, steps 920 and 921.

Figure 10:
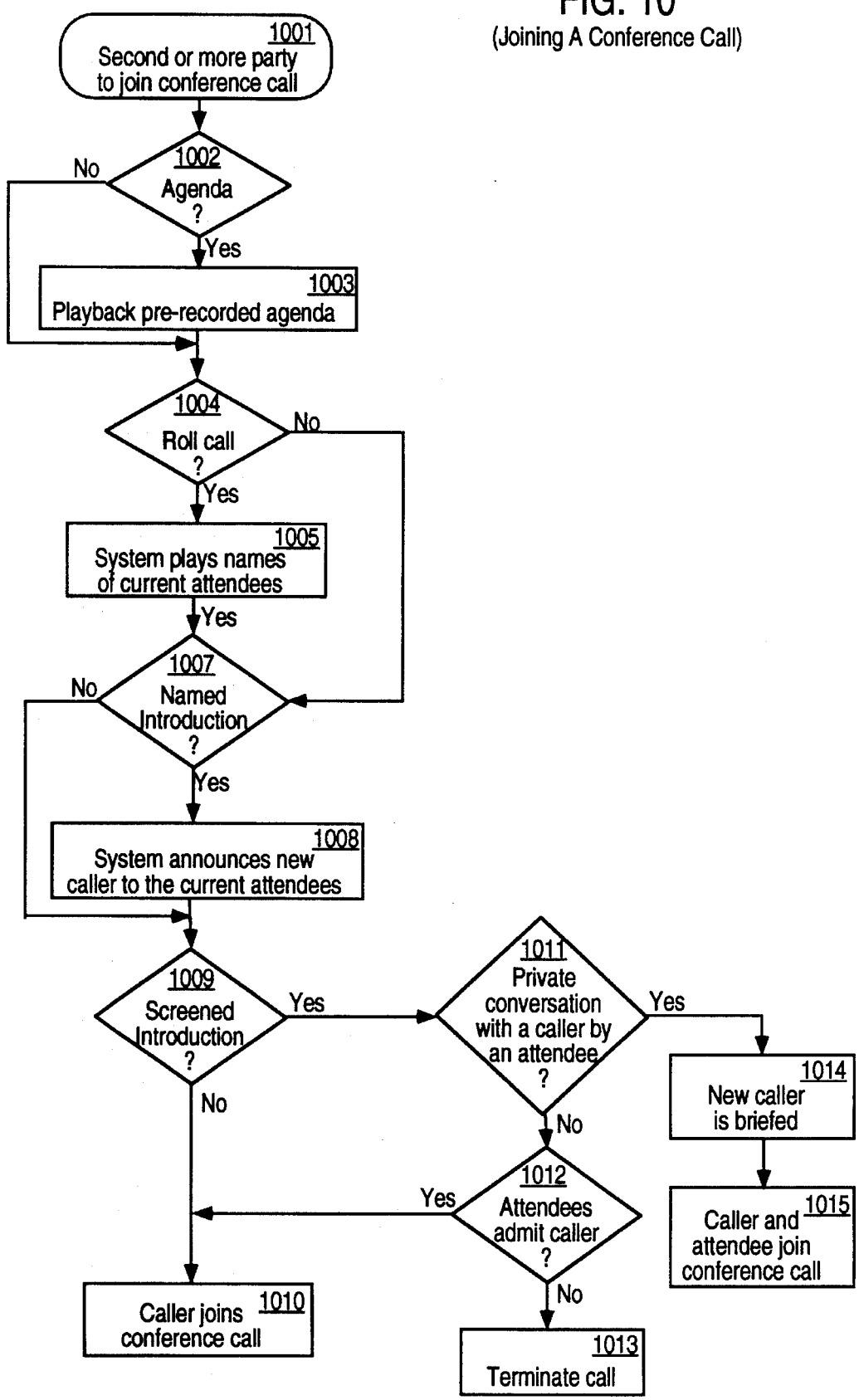
FIG. 10 is a flowchart showing the steps for joining a teleconference which is already in progress.

FIG. 10 is a flowchart showing the steps for joining a conference call which is already in progress. In the present invention, a second or successive caller (e.g., third, fourth, fifth, etc.) may join a conference call which is already in progress due to the connection of one or more prior callers, step 1001. Prior to connecting to the ongoing teleconference, the caller has the option to hear the conference call agenda that was pre-recorded by the conference call organizer, step 1002. If so requested by the caller depressing one or more predetermined touch tone buttons on the telephone, the system plays back the agenda to the caller, step 1003. The caller also has the option of requesting a "roll call" to determine the parties who have already logged on and are currently attending the conference call, step 1004. If a roll call is requested by the caller, the system speaks the names and/or identifications (e.g., their profile number) of the current attendees, step 1005. For example, the system can respond by stating, "The following parties are already on the conference call: Xxxx, Yyyy, and Zzzz. In addition, there are 'n' participants who have not identified themselves by name. To repeat this information, press 1. To join the conference, press #." Xxxx, Yyyy, and Zzzz are the recorded spoken names that people have recorded either in their profile or in short term memory when they signed on to the system.

When the caller joins the conference call, the system determines whether the named introductions feature has been enabled by the conference call organizer (as set in FIG. 7, step 703), step 1007. If so, the system accesses the caller's profile to reads a predetermined field of the profile which is a pointer to the memory location at which the recorded spoken name is stored. Each caller having a profile on the system records into the system his/her name as spoken by the caller. Thus, when the caller is to join a conference, system generates a verbal announcement of the new caller, using a prerecorded message and the caller's spoken name, to the current attendees, step 1008. For example, the attendees would hear a "*bong!* {caller's name} is joining the conference call."

The system also determines whether the conference call organizer had enabled the screened introductions feature (as set in FIG. 7, step 713), step 1009. If the screened introductions feature has been disabled by the organizer, the caller is connected to the conference call, step 1010. Otherwise, if the screened introductions feature is in effect, the system informs the caller, "The organizer has requested that all parties entering this conference call be specifically admitted. Please hold while the attendees are informed of your presence." Meanwhile, the system announces the caller to the attendees. The attendees have the option of either admitting or denying access to the new caller, step 1012. For example, the system could interrupt the meeting, "*Bong!* {name of caller} wishes to join, please press # to admit them or please press * to deny them access to the conference call." If the attendees admit the caller, the caller is allowed to join the conference call in progress, step 1010. The system informs the caller that, "You are now being admitted to the conference call." Otherwise, when the caller is denied access, the system informs the caller that, "The attendees would prefer that you not join the conference call at this time. You will now be disconnected." The caller is then disconnected, step 1013. Each of the attendees has the capability of invoking these options without disturbing the remaining attendees. Thus, the DTMF tones generated are not broadcasted to the attendees and the voice prompts and announcements generated for the requesting attendee are broadcasted only to that attendee.

In one embodiment of the present invention, one or more attendees may choose to break off from the main conference and hold a private conversation with the new caller, step 1011. If this option is invoked, the new caller is briefed by the attendee, step 1014. Afterwards, both the caller and the attendee may join the conference call in progress, step 1015. It should be pointed out that in another embodiment, the organizer can select to have those callers leaving a conference call be identified to those attendees who are remaining. For example, when Xxxx leaves the conference, the system announces that, "*Bong!* Xxxx has departed."

Figure 11:
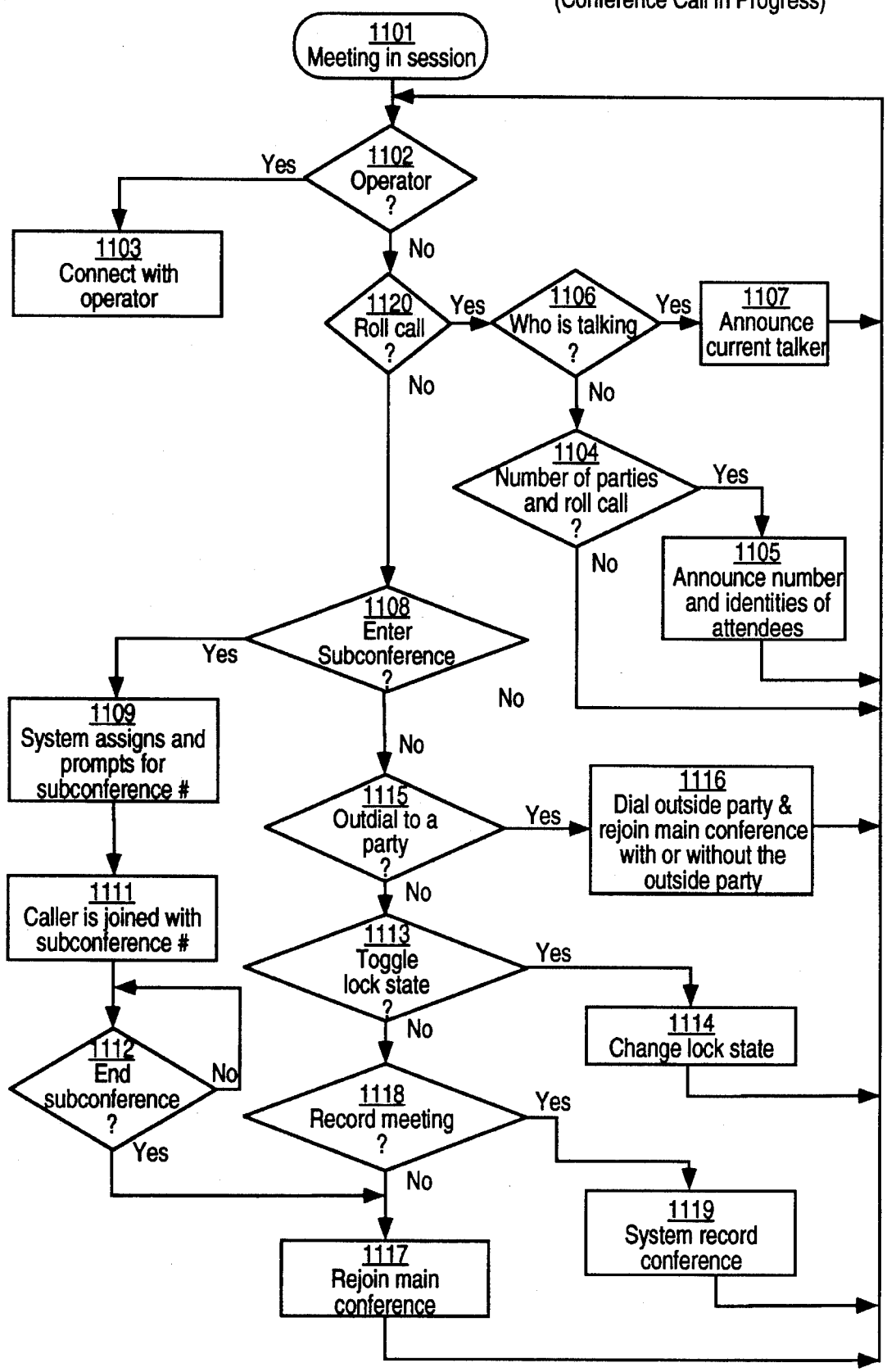
FIG. 11 is a flowchart showing the options available to the attendees while a teleconference is in progress.

FIG. 11 is a flowchart showing the options available to each of the attendees while a conference call is in progress. Several options can be invoked by any of the attendees, even while the conference call is still in session, step 1101. These features are invoked by an attendee by depressing certain touch tone phone keys to generate DTMF tones. These tones are detected by the system, and the system responds by providing the functionality selected only to the attendee. The system continually checks to determine whether an attendee wishes to initiate any of these options. For example, the system determines whether any of the attendees wish to be connected to the operator, step 1102. If so, that particular attendee is connected to the operator (if available), step 1103.

Another option available to attendees is that of roll call, step 1120. If this option is selected, the system asks the requesting attendee if the attendee wishes to know the identification of who is currently talking, step 1106. Whenever this option is invoked, the system announces the name (or other identification) of the current talker, step 1107. The requesting attendee also has the option, step 1104, of the system announcing the number and identities of all the current attendees, step 1105.

In the present invention, two or more attendees also have the capability to enter into their own subconference call, step 1108. A plurality of conferences (e.g., the main conference call, subconference 1, subconference 2, etc. ) can be conducted simultaneously by the attendees who were originally in the main conference call. If two or more attendees decide to enter into a "side" conference call, attendee enters in the proper DTMF codes to request a subconference. The system responds by assigning a subconference number and announcing to the requesting attendee the assigned subconference call number. The requesting attendee informs those to participate in the subconference call of the subconference call number. Subsequent parties wishing to join that subconference and entering the proper DTMF code to join a subconference are prompted for the assigned subconference number, step 1109. In step 1111, the attendee is allowed to join the requested subconference. At the end of the subconference, step 1112, the attendees to the subconference are allowed to rejoin the main conference call, step 1117.

If the caller wishes to dial an outside party, step 1115, the system prompts for the phone number of that party and automatically dials and connects that party, step 1116. Furthermore, the attendee has the option of reconnecting both themselves and the outside party, back to the main conference. Alternatively, the attendee may disconnect from the outside party and rejoin the main conference call. An example of a system prompt might be, "Please enter the number of the person you wish to reach. The system will then dial the person. To add yourself and the new party to the conference call, press #. To disconnect from the called party, press *. Please enter the number to dial now."

Other options available to attendees include toggling the lock state, step 1113. At any point in the conference call, the organizer of the conference call or an attendee designated by the organizer, can toggle the lock state (i.e., change locked state to unlocked state and vice versa), step 1114.

Before the conference call even starts or during the conference call, the organizer or any of the attendees can request to have the system record and store the conference call, step 1118. If a conference call is already in progress, any attendee may request that it be recorded (e.g., by pressing *5). Thereupon, the system starts recording the conference call, step 1119. The recording continues until the attendee indicates termination (e.g., by pressing *55) or when the conference call adjourns. The recording of the conference call can subsequently be accessed for playback by authorized callers.

Thus, a voice processing interface for an audio teleconferencing system is disclosed.

What is claimed is:

1. A teleconferencing system that uses voice processing to connect callers to teleconferences and guide callers through teleconferencing functions without operator intervention comprising:

a memory comprising teleconference information which identifies a teleconference to be held, and a name database comprising a spoken name of at least one caller to the teleconference, said spoken name indexed by a caller's identification;

a switching matrix for selectively connecting telephone trunk lines, to which callers to the teleconference are coupled, for receipt of incoming voice signals from the telephone trunk lines to which callers to the teleconference are coupled and output of voice signals to the telephone trunk lines to which callers to the teleconference are coupled;

a plurality of digital signal processors (DSPs) coupled to said switching matrix for mixing a plurality of audio signals received on said trunk lines to provide teleconferencing among a plurality of callers, wherein the plurality of callers teleconferenced become teleconference attendees;

a system controller coupled to the memory and the switching matrix, said controller generating audio prompts to the callers and to the attendees to guide the callers and attendees in the operation of the teleconferencing system, one of said audio prompts requesting a caller's identification to be entered prior to be admitted to a teleconference, and, in response to an entered caller's identification, said controller retrieving the spoken name from the memory indexed by the caller's identification and generating an announcement to the attendees of the teleconference using the retrieved spoken name, said announcement announcing that the caller is to join the conference, said switching matrix causing the announcement to be output on the trunk lines such that the attendees receive the announcement.

2. The teleconferencing system of claim 1, wherein said memory further comprises a teleconferencing list that identifies attendees to the teleconference, and said controller, responsive to a DTMF signal initiated by one of said attendees, reading the teleconferencing list to determine the caller identification of each of the attendees, retrieving the spoken name of each of the attendees from the name database based upon the caller identification, and announcing to the attendee a roll call playing the spoken name of each of the attendees of said teleconference.

3. The teleconferencing system of claim 1, wherein said memory further comprises a teleconferencing list that identifies attendees to the teleconference, said system controller, prior to said caller being connected to said teleconference to become an attendee, and responsive to a DTMF signal initiated by the caller, reads the teleconferencing list to determine the caller identification of each of the attendees, retrieves the spoken name of each of the attendees from the name database and generates an announcement to the caller comprising a roll call playing the spoken name of each of the attendees of said teleconference.

4. The teleconferencing system of claim 1, wherein said memory further comprises a teleconferencing list that identifies attendees to the teleconference, said system controller detecting when one of said attendees disconnects from said teleconference, reading the teleconferencing list to determine the caller identification of the disconnected attendee, retrieving the spoken name of the disconnected attendee, and announcing to attendees remaining in said teleconference the identity of said disconnected attendee.

5. The teleconferencing system of claim 4, wherein announcement of the disconnected attendee is selectively enabled.

6. The teleconferencing system of claim 1, wherein announcement of callers connecting to the teleconference is selectively enabled.

7. The teleconferencing system of claim 1, wherein said system controller, responsive to a DTMF signal generated by an attendee, determines which of said attendees is currently speaking, retrieves the spoken name of the attendee from the name database and generates an announcement providing the spoken name of the attendee who is currently speaking.

8. The teleconferencing system of claim 1, wherein said system controller generates audio prompts to a teleconference organizer to prompt the teleconference organizer to enter teleconference information regarding a teleconference to be scheduled, said system controller causing the teleconference information entered to be stored in the memory.

9. The teleconferencing system of claim 8, wherein said system controller further prompts the teleconference organizer to specify if the teleconference is to be recorded.

10. The teleconferencing system of claim 8, wherein said system controller further prompts the teleconference organizer to speak a meeting name, said system storing the meeting name in memory, wherein the system can generate an announcement of the meeting name to a caller to confirm joining a teleconference.

11. The teleconferencing system of claim 8, wherein said system controller prompts the teleconference organizer to enter a password corresponding to said teleconference to be scheduled, said system controller connecting callers to the scheduled teleconference after the callers enter said password.

12. The teleconferencing system of claim 8, wherein said system controller prompts the teleconference organizer to provide a start time and end time of the teleconference to be scheduled.

13. The teleconferencing system of claim 8, wherein said system controller further prompts the teleconference organizer to specify which of said attendees are allowed to speak and be heard by the other attendees.

14. The teleconferencing system of claim 8, wherein said system prompts said teleconference organizer for an agenda of the teleconference, said system controller, responsive to a subsequent DTMF signal entered by a requesting caller or a requesting attendee, generates an announcement to the requesting caller or requesting attendee comprising the agenda.

15. The teleconferencing system of claim 1 wherein said system controller prompts a conference attendee to enter a DTMF signal to lock said teleconference, wherein subsequent callers are not connected to said teleconference once said teleconference is locked.

16. The teleconferencing system of claim 15, wherein if the teleconference is locked, and a subsequent caller wishes to join the teleconference, said system controller generates an audio prompt to the conference attendees that the subsequent caller wishes to join the teleconference and to enter a DTMF signal to indicate whether to permit the caller to join the teleconference, wherein the conference attendees can select whether to permit the subsequent caller to join the teleconference.

17. The teleconferencing system of claim 1, wherein the memory further comprises audio data of a spoken meeting name, said system in response to a caller entering in a meeting identification, generating an announcement using the spoken meeting name to confirm to a caller that a valid meeting identification has been entered.

18. The teleconferencing system of claim 1, wherein said system controller, responsive to a DTMF signal entered by a requesting attendee, disconnects a last conference attendee to join the teleconference.

19. The teleconferencing system of claim 1, wherein if said caller's identification is not found in the name database said caller is identified as a guest, said system controller generating audio prompts to prompt the guest to speak his name; the system controller storing the spoken name of the guest temporarily in memory for retrieval during the teleconference.

20. The teleconferencing system of claim 1, wherein said system controller generates, a predetermined amount of time prior to an end time of the teleconference, an audio prompt to said attendees comprising a warning that the teleconference will end at the expiration of the predetermined amount of time.

21. The teleconferencing system of claim 1, said system controller, responsive to a DTMF signal generated by one of said attendees, initiating recording of said teleconference for storage in said memory.

22. The teleconferencing system of claim 1, said system controller, responsive to a DTMF signal generated by a requesting attendee, instructing said switching matrix and DSPs to temporarily disconnect the requesting attendee from the teleconference, and permitting said requesting attendee to call an outside party, said system controller, responsive to a second DTMF signal generated by the requesting attendee subsequent to being temporarily disconnected from the teleconference, rejoining said requesting attendee and said outside party to the teleconference.

23. The teleconferencing system as set forth in claim 1, wherein said DSPs further compresses voice data of the spoken name to be stored in the memory and decompresses the spoken name retrieved from the memory.

24. A teleconferencing system, comprising:
- line cards connected to telephone trunk lines, signals representative of callers to a teleconference coming to said system over said telephone trunk lines;
- a switching matrix coupled to the line cards for selectively connecting callers such that the connected callers are attendees of the teleconference and the attendees can audibly communicate with each other in real-time;
- a plurality of digital signal processors (DSPs) coupled to said switching matrix for mixing voice signals of attendees such that the attendees hear the mixed signals, said DSPs further detecting DTMF signals on said trunk lines;
- a memory for storing pre-recorded audio prompts;
- a system controller coupled to the memory, line cards, switching matrix and DSPs, said system controller controlling the switching matrix, DSPs and line cards to establish a teleconference, said system controller responsive to predetermined DTMF signals detected by the DSPs to cause the switching matrix, line cards and DSPs to initiate a subconference between a subset of attendees of the teleconference, and said system controller retrieving pre-recorded prompts for playback to the attendees for prompting the attendees to move between said teleconference and said subconference.

25. The teleconferencing system of claim 24, wherein a plurality of subconferences are conducted during said teleconference, said DSPs mixing voice signals of subconference attendees of each subconference to provide subconferenced mixed signals to subconference attendees.

26. The teleconferencing system of claim 25, wherein said system controller assigns a subconference number and an attendee enters DTMF signals representative of said subconference number to join the subconference, said system controller responsive to the DTMF signals causing the attendee to join the subconference.

27. The teleconferencing system of claim 24, wherein said subconference attendees are rejoined with said teleconference when said subconference is terminated.

28. The teleconferencing system of claim 24, wherein said system controller prompts an attendee for a password before access to said subconference is granted.

29. The teleconferencing system of claim 24, wherein said voice subsystem responsive to a first DTMF signal announces a roll call identifying each attendee of said subconference.

30. The teleconferencing system of claim 24, wherein said system controller generates an announcement identifying each attendee who joins said subconference.

31. The teleconferencing system of claim 24, wherein said voice subsystem announces an identity of each attendee who leaves said subconference.

32. The teleconferencing system of claim 24 wherein said system controller further comprises a means for locking said subconference to deny access of subsequent attendees to said subconference.

33. The teleconferencing system of claim 32, wherein if the subconference is locked, and a subsequent attendee wishes to join the subconference, said system controller generates an audio prompt to the subconference attendees that the subsequent attendee wishes to join the subconference and to enter a DTMF signal to indicate whether to permit the subsequent attendee to join the subconference, wherein the conference attendees can select whether to permit the subsequent attendee to join the subconference.

34. The teleconferencing system of claim 24, wherein said system controller further comprising a means for detecting which of said attendees of said subconference is currently speaking and announcing the identity of that attendee.

35. The teleconferencing system of claim 24, wherein said system controller generates voice prompts to prompt a subconference organizer to identify certain subconference attendees that are prohibited from being heard by other subconference attendees.

36. The teleconferencing system of claim 24, said system controller further comprising a means responsive to a DTMF signal to initiate recording of said subconference, said recording stored in the memory.

37. The teleconferencing system of claim 24, said system controller, responsive to a DTMF signal indicating that a requesting subconference attendee is to temporarily disconnect from said subconference, controlling a line card to seize a trunk line and cause the line to go off hook, controlling the switching matrix to switch the trunk line connected to said requesting subconference attendee to be connected to the seized trunk line wherein said requesting subconference attendee can dial and connect to an outside party, said system controller, responsive to a subsequent DTMF signal, controlling the switching matrix and DSPs to enable the requesting subconference attendee to subsequently rejoin said subconference with said outside party.

38. In a teleconferencing system having a switching matrix for selectively connecting trunk lines, a processor for processing a plurality of audio signals on said trunk lines to provide conferencing among a plurality of attendees to a teleconference, and a voice subsystem for playing prerecorded prompts, a method of processing telephone calls comprising the steps of:

storing voice data of a spoken name of at least one caller;

generating a caller profile database, said caller profile database comprising at least one caller profile of the caller comprising caller identification and a memory address pointer to the voice data representative of a spoken name of the caller;

detecting an incoming telephone call by the caller to said teleconferencing system;

prompting for an identification of the caller;

using said identification, retrieving the memory address pointer from the caller profile database;

retrieving the spoken name of the caller from memory;

generating an audio announcement that the caller is to join the teleconference to the attendees of the teleconference, said announcement including the spoken name of the caller retrieved from memory; and joining the caller to the teleconference.

39. The method of claim 38 further comprising the steps of:

detecting a first DTMF signal generated;

determining the attendees to the teleconference;

retrieving the spoken name of each attendee from memory; and generating a roll call consisting of the spoken name of each attendee of said conference.

40. The method of claim 38, wherein said DTMF step is generated by a caller prior to joining the teleconference, and said step of generating a roll call comprises playing the roll call to the caller.

41. The method of claim 38, further comprising the steps of:

detecting when an attendee leaves the teleconference;

determining the caller identification of the attendee leaving the teleconference;

using said identification, retrieving the memory address pointer from the caller profile database;

retrieving the spoken name of the attendee from memory;

generating an audio announcement that an attendee is leaving the teleconference, said announcement including the spoken name of the attendee retrieved from memory.

42. The method of claim 38 further comprising the steps of:

detecting the generation of a predetermined DTMF signal;

determining an attendee who is currently talking;

generating an announcement of an identity of said attendee who is currently talking.

43. The method of claim 38 further comprising the steps of:

prompting a teleconference organizer to record an agenda of the teleconference;

detecting the generation of a predetermined DTMF signal by the caller; and announcing said agenda to said caller.

44. The method of claim 38 further comprising the steps of:

prompting a teleconference organizer to input the spoken meeting name;

storing the spoken meeting name in memory; and in response to a caller entering in a meeting identification, generating an announcement comprising the spoken meeting name to confirm to a caller that a valid meeting identification has been entered.

45. The method of claim 38 further comprising the steps of:

prompting a teleconference organizer to enter a password to access the teleconference;

entering a password corresponding to said conference;

prompting said caller to enter said password;

admitting said caller to said conference if said entered password is valid; and denying access of said caller to said conference if said entered password is invalid.

46. The method of claim 38 further comprising the steps of:

detecting the generation of a predetermined DTMF signal by a teleconference attendee;

locking said teleconference such that access to said teleconference is denied to all subsequent callers.

47. The method of claim 46, wherein if the teleconference is locked and a subsequent caller wishes to join the teleconference, said method further comprising the steps of:

generating an audio prompt to the attendees that the subsequent caller wishes to join the teleconference;

said attendees entering a DTMF signal to indicate whether to permit the subsequent caller to join the teleconference;

joining the subsequent caller to the teleconference if the attendee enters a DTMF signal indicating that the subsequent caller can join the teleconference.

48. The method of claim 38, further comprising the step of, responsive to a predetermined DTMF signal generated by a conference attendee, disconnecting a last conference attendee to join the teleconference.

49. The method of claim 38 further comprising the steps of:

prompting a teleconference organizer to specify attendees that have listen only access to the teleconference;

specifying which of said attendees are to have listen only access; and prohibiting attendees that have listen only access from being heard by other attendees of said teleconference.

50. The method of claim 38 further comprising the step of generating an audio announcement to attendees of the teleconference that said teleconference is to end within a specified amount of time.

51. The method of claim 38 further comprising the steps of:

detecting the generation of a predetermined DTMF signal;

recording said teleconference in memory.

52. The method of claim 38 further comprising the steps of:

detecting the generation of a predetermined DTMF signal by a requesting attendee;

temporarily disconnecting the requesting attendee from said teleconference;

connecting the requesting attendee to an off-hook trunk line thereby permitting the requesting attendee to dial and connect to an outside party; and responsive to a second certain DTMF signal, rejoining said requesting attendee and said outside party to said teleconference.

53. The method of claim 38, wherein the caller identification is not found in the caller profile database, said method further comprising the steps of:

prompting for the caller to speak his name;

storing temporarily in memory voice data of the spoken name of the caller; and generating an audio announcement that the caller is to join the teleconference to the attendees of the teleconference, said announcement including the spoken name of the caller stored in memory.

54. In teleconferencing system comprising teleconferencing resources, and a memory comprising voice prompts, a method of scheduling a teleconference utilizing voice prompts stored in the memory, comprising the steps of:

providing a scheduling database comprising teleconferencing resource information, the teleconferencing system resources operating based upon the scheduling database;

retrieving voice prompts from the memory to prompt a caller to enter schedule information pertaining to said teleconference, said teleconferencing system conducting said teleconference according to said schedule information if resources are available;

determining whether said teleconferencing system has resources available to handle said teleconference by comparing said schedule information entered by said caller to the scheduling database;

if said resources are not available to handle said teleconference according to said schedule information entered by said caller:
a) generating an announcement informing said caller that said teleconference cannot be scheduled according to said schedule information; and
b) prompting said caller to modify said schedule information; if said resources are available:
c) confirming to said caller that said teleconference is scheduled;
d) assigning a conference number;
e) storing said schedule information in said schedule database.

55. The method of claim 54, wherein said prompting step is comprised of the steps of:

prompting said caller for a time of said teleconference;

prompting said caller for a number of attendees of said teleconference; and prompting said caller for features to be enabled during said teleconference.

56. The method of claim 54, wherein the step of prompting comprises the step prompting the caller to indicate if the teleconference is to be recorded.

57. The method of claim 54 wherein if said resources are not available, said method further comprising the step of said teleconferencing system suggesting an alternative schedule based upon available resources determined from the scheduling database.

58. The method of claim 54 further comprising the step of modifying said schedule information stored in said scheduling database if said caller enters said conference number and elects to change said schedule information.

59. The method of claim 54, wherein the step of prompting comprises the step of prompting the caller to record the meeting name.

60. The method of claim 54, further comprising the step of conducting a scheduled teleconference according to the resource information in the scheduling database, said step comprising the steps of:

prompting a caller to said teleconference to identify said teleconference by entering the teleconference number;

detecting DTMF tones representative of the teleconference number;

determining whether the meeting is locked;

connecting said caller to said teleconference if said caller entered said teleconference identification and said meeting is not locked.

* * * * *

UNITED STATES PATENT AND TRADEMARK OFFICE
CERTIFICATE OF CORRECTION

PATENT NO. : 5,483,588
DATED : January 9, 1996
INVENTOR(S) : Eaton et al.

It is certified that error appears in the above-identified patent and that said Letters Patent is hereby corrected as shown below:

In column 10 at line 27 delete "entry,." and insert --entry.--

Signed and Sealed this

Twenty-eighth Day of March, 2000

Attest:

Q. TODD DICKINSON

*Attesting Officer*     *Commissioner of Patents and Trademarks*